(12) United States Patent
Van De Sluis et al.

(10) Patent No.: US 10,531,548 B2
(45) Date of Patent: Jan. 7, 2020

(54) DYNAMIC LIGHT EFFECT BASED ON AN IMAGE

(71) Applicant: PHILIPS LIGHTING HOLDING B.V., Eindhoven (NL)

(72) Inventors: Bartel Marinus Van De Sluis, Eindhoven (NL); Bas Driesen, Weert (NL); Berent Willem Meerbeek, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/060,698

(22) PCT Filed: Dec. 6, 2016

(86) PCT No.: PCT/EP2016/079847
§ 371 (c)(1),
(2) Date: Jun. 8, 2018

(87) PCT Pub. No.: WO2017/097741
PCT Pub. Date: Jun. 15, 2017

(65) Prior Publication Data
US 2018/0376564 A1 Dec. 27, 2018

(30) Foreign Application Priority Data

Dec. 10, 2015 (EP) ...................................... 15199427
Dec. 15, 2015 (EP) ...................................... 15200171

(51) Int. Cl.
*H05B 37/02* (2006.01)
*G06T 7/70* (2017.01)
(Continued)

(52) U.S. Cl.
CPC ............. *H05B 37/029* (2013.01); *G06T 7/70* (2017.01); *H05B 33/086* (2013.01); *H05B 37/0245* (2013.01); *G06K 9/48* (2013.01)

(58) Field of Classification Search
CPC .. G06K 9/3241; G06K 9/4671; G06K 9/4652; G06K 9/3233; G06K 8/48;
(Continued)

(56) References Cited

U.S. PATENT DOCUMENTS 10,187,963 B2 * 1/2019 Van De Sluis .... H05B 33/0863
2003/0053686 A1 * 3/2003 Luo ........................... G06K 9/38
382/165

(Continued)

FOREIGN PATENT DOCUMENTS

EP        2120512 A1 * 11/2009 ........... H05B 37/029
EP        2120512 A1    11/2009
(Continued)

*Primary Examiner* — Douglas W Owens
*Assistant Examiner* — Amy X Yang
(74) *Attorney, Agent, or Firm* — Meenakshy Chakravorty

(57) ABSTRACT

A method is provided for controlling one or more lighting devices to generate a dynamic light effect based on an image. A first area in the image is selected based on first selection criteria (e.g. object recognition). Within this first area, a sequence of sub-areas (260, 262, 264) are selected based on second selection criteria (e.g. zooming in to a recognized object). Color values are extracted from each sub-area and the one or more lighting devices are controlled based on the extracted color values.

13 Claims, 5 Drawing Sheets

(51) Int. Cl.
*H05B 33/08* (2006.01)
*G06K 9/48* (2006.01)

(58) Field of Classification Search
CPC .. H05B 33/086; H05B 37/0245; H05B 37/02;
G06T 5833/086
USPC .................................................. 315/291–312
See application file for complete search history.

(56) References Cited

U.S. PATENT DOCUMENTS

| | | |
|---|---|---|
| 2005/0041161 A1 | 2/2005 | Dowling et al. |
| 2007/0242162 A1 * | 10/2007 | Gutta ........................ H04N 9/12 |
| | | 348/645 |
| 2015/0022123 A1 | 1/2015 | Van De Sluis et al. |

FOREIGN PATENT DOCUMENTS

| | | | | |
|---|---|---|---|---|
| WO | 2011124933 A1 | 10/2011 | | |
| WO | WO-2011124933 A1 * | 10/2011 | ............... | H04N 9/73 |
| WO | 2017080879 A1 | 5/2017 | | |
| WO | 2017081054 A1 | 5/2017 | | |

* cited by examiner

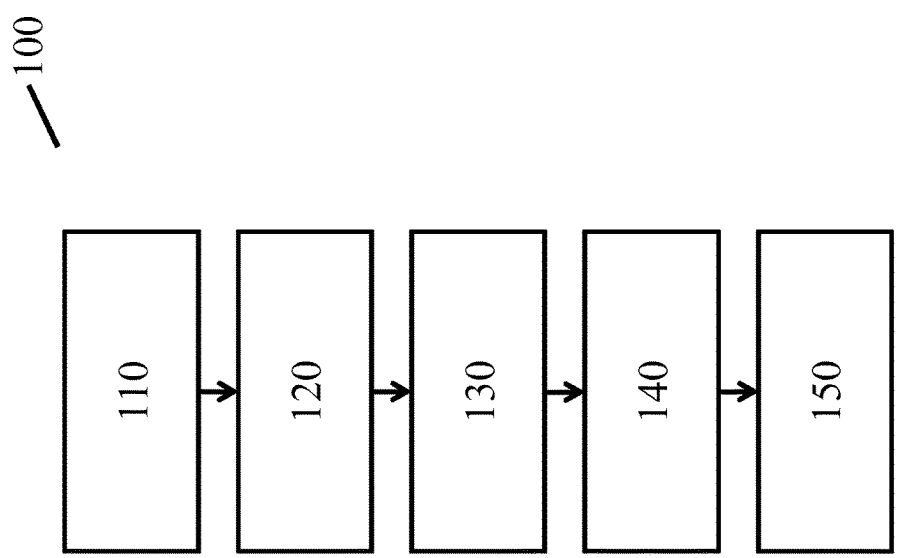

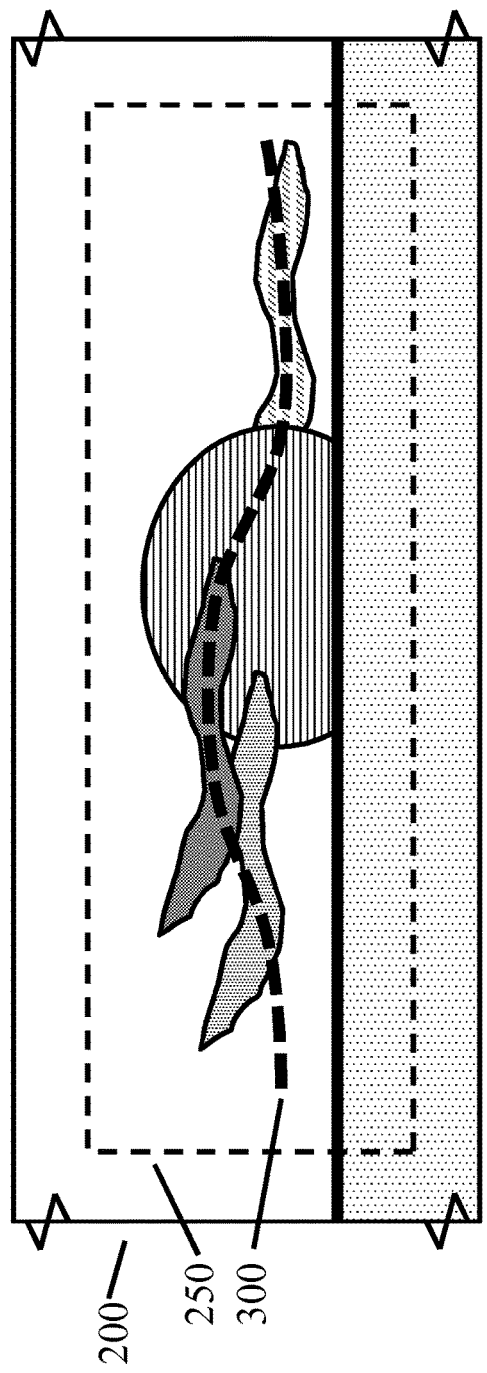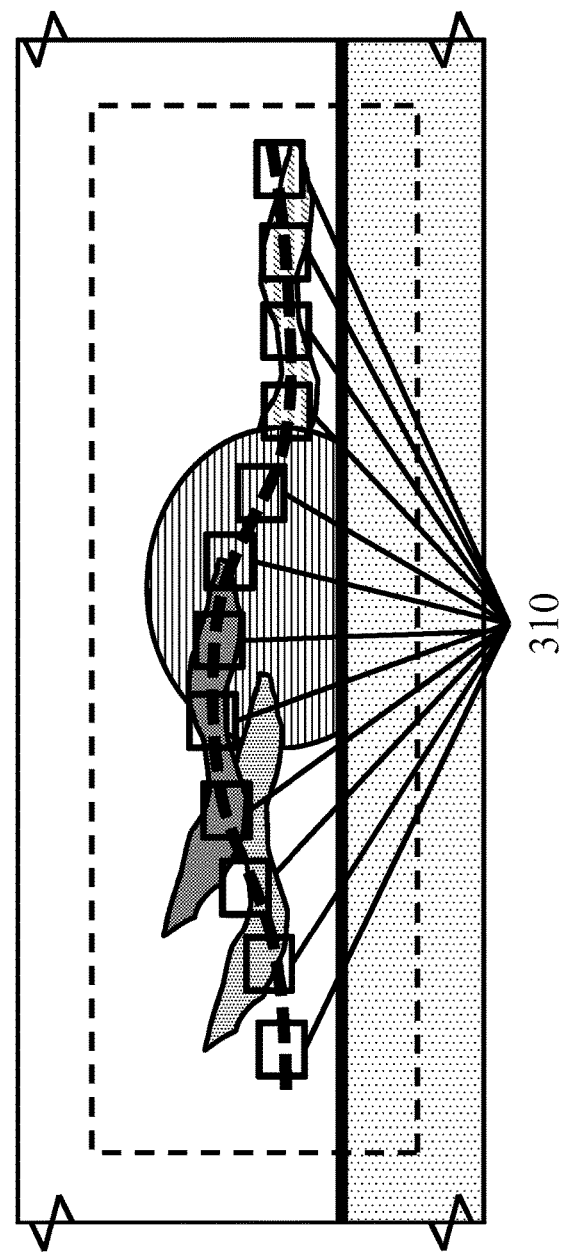

DYNAMIC LIGHT EFFECT BASED ON AN IMAGE

CROSS-REFERENCE TO PRIOR APPLICATIONS

This application is the U.S. National Phase application under 35 U.S.C. § 371 of International Application No. PCT/EP2016/079847, filed on Dec. 6, 2016, which claims the benefit of European Patent Application Numbers 15199427.4, filed on Dec. 10, 2015 and 15200171.5, filed on Dec. 15, 2015. These applications are hereby incorporated by reference herein.

FIELD OF THE INVENTION

The invention generally relates to a method of controlling a lighting device, and more specifically to a method for generating a dynamic light effect. The invention further relates to a computer program product for performing the method.

BACKGROUND OF THE INVENTION

Modern lighting devices offer advanced control features, such as color control and dim level control. Output of a lighting device can be controlled through a user interface, for example, an application on a smart phone. Current user interfaces allow individual control of lighting devices, such as picking individual colors based on which the light output of a lighting device is controlled. The light output can be static or dynamic (i.e. changing over time). Especially when a dynamic light effect is required, it is tedious for a user to select a large number of colors to provide input for such an effect. There is a need for a simplified and intuitive control option for generating a dynamic light effect.

SUMMARY OF THE INVENTION

The inventors have realized that controlling a lighting device based on an image provides intuitive control to a user. Methods known in the state of the art, requiring a user to pick a sequence of colors in an image (e.g. using a color picker) are burdensome for the user when applied to generating a dynamic light effect. An automated method in which fully random colors in an image are picked can provide undesirable light effects. The method proposed by the inventors offers intuitive control based on an image (e.g. a single, static image), yet also simplified control.

In a first aspect, a method of controlling a lighting device to generate a dynamic light effect is provided. The method comprises: receiving an image; selecting a first area in the received image based on first selection criteria; selecting a sequence of sub-areas in the first area based on second selection criteria; extracting a set of color values, each color value extracted from a sub-area in the sequence of sub-areas; and controlling the lighting device based on the extracted set of color values to render a dynamic light effect. The image can be displayed to a user via a user interface, for example: if the user has to select an image, the same interface in which a user selects the image can display the image; the image can be shown through a wall panel, smart phone or other device when the image is selected automatically or selected by the user.

To create a dynamic light effect, the lighting device is controlled to emit light of a first color from the set of colors and subsequently of a second color from the set of colors, and so on. The dynamic light effect can loop (i.e. emit a first color, a second color, . . . , a Nth color; and start again from the first color) or bounce (i.e. emit a first color, a second color, . . . , a Nth color and traverse back via N−1, N−2, . . . , to the first color), such that a single dynamic light effect is rendered multiple times. The dynamic light effect can comprise transitions, such as a transition from a first color to a second color, each comprised in the set of colors, through a third color, not necessarily comprised in the set of colors.

The sub-areas in the sequence of sub-areas can be overlapping, for example to support smooth transitions in a dynamic light effect, or non-overlapping. As part of extracting color values from a sub-area, the color values extracted from one or more other sub-areas in the sequence of sub-areas can be taken into account. For example, color values can be extracted that are similar in hue and/or brightness to the ones already part of the set of color values.

The extracted colors can be rendered in a particular order, such as in the same order as the sub-areas in the sequence of sub-areas from which the colors have been extracted. The sequence of the sub-areas then determines the order of the colors in the set of colors. The set of colors is thus, in this example, an ordered set of colors and the dynamic light effect is generated based on the ordered set of colors, such that at least a part of the dynamic light effect comprises rendering colors, by a lighting device, in a sequence following the sequence of the sub-areas from which the colors have been extracted. The color(s) extracted from a first sub-area would then be rendered first, those from a second sub-area would then be rendered second and those from a third sub-area would then be rendered last, or vice-versa.

In an embodiment of the method according to the first aspect, selecting the first area in the received image based on the first selection criteria comprises: detecting a focal point in the received image; and selecting as the first area an area in the received image comprising the detected focal point. This is beneficial as it allows automatic selection of the first area to support further ease of use for a user. As an example, the selection can be performed without user intervention, or the user can be presented multiple first areas, each based on a focal point or other criteria, to select from.

In another embodiment of the method according to the first aspect, selecting the first area in the received image based on the first selection criteria comprises: determining a color homogeneity of each of a plurality of areas in the received image; and selecting one of the plurality of areas as the first area based on the determined color homogeneity of the one of the plurality of areas. This allows, for example, to detect an area in the received image made up of a color set that is more homogenous than the color set that the remainder of the image outside the area is made up out of; and selecting this area as the first area. This is advantageous as it allows a color, and indirectly possibly also an object, that is visually dominant in the image to be selected. A dynamic light effect based on this principle of selection of the first area can be highly recognizable by a user as being related to the image.

In yet another embodiment of the method according to the invention, selecting the first area in the received image based on the first selection criteria comprises: detecting an object in the received image; and selecting as the first area an area comprising the detected object. The detected object can be one of a set of natural phenomena, the set of natural phenomena comprising: a fire, a cloud, a body of water, a waterfall, and a heavenly body. Detecting a salient feature and computer vision methods supporting such are known to the person skilled in the art. Applying object selection to perform the selection of the first area is beneficial as it enables further automated creation of the dynamic light effect requiring even less user intervention, while resulting in a generated light effect that matches a user's expectations based on the received image.

In an especially advantageous embodiment of the method according to the first aspect, receiving the image comprises a user selecting the image from a set of images. For example, the user can select an image from an image library of images (s)he has taken, the user can take an image with a camera integrated into a smart phone executing the method, the user can download an image from a remote service, etc.

In yet further embodiments of the method according to the invention, selecting the sequence of sub-areas in the first area based on the second selection criteria comprises: determining a path in the first area in the received image; and selecting the sequence of sub-areas in the first area along the determined path. The determined path can run parallel to an axis of the received image. Determining the path in the first area of the received image can comprise: detecting one or more objects in the first area of the received image, such that the path crosses at least one of the one or more detected objects. As another example, the path in the first area of the received image can be selected by a user. For example, a user can draw a line on the received image as displayed in a user interface, such as through a touch screen of a smart phone.

In an especially beneficial embodiment of the method according to the first aspect, the sub-areas in the sequence of sub-areas in the first area are of different sizes. As an example, the sub-areas in the sequence of sub-areas can be of an increasingly smaller size. This creates a zoom effect, whereby, for example, when a first area is selected based on object recognition, the object is zoomed in on. Other options comprise zooming out of an object, panning across an image to an object and then zooming in or out, etc.

In an embodiment of the method according to the first aspect, extracting a color value from a sub-area in the sequence of sub-areas comprises: extracting a dominant color value. This increases the likelihood of a user recognizing the dynamic light effect as being related to the image the user has seen on which the effect is based. The dominant colors are highly recognizable in both the image and the light effect.

In a further embodiment of the method according to the first aspect, the method further comprises: determining a particular order of the extracted color values based on at least one of: hue, saturation and brightness of the extracted color values, such that the one or more lighting devices are controlled based on the determined order of extracted color values. This allows the dynamic light effect to be rendered such that colors of the same hue are rendered in sequence (or out of sequence). An examplary use of such is a dynamic effect wherein the light level dims up as the various colors are rendered.

In a second aspect, a computer program product is provided for performing the method according to the first aspect and any of its embodiments. Such a computer program product can reside on a smart phone, tablet, wall panel or other device as an application. As a further example, the computer program product can be made downloadable through an application store accessible to the smart device. The computer program product can run on a single device, such as a single smart phone, or across multiple devices. For example, user input can be acquired through a user interface on a smart device, whereas image processing steps are performed on a server. As yet another example, control commands to control the one or more lighting devices to generate the dynamic light effect can be sent from the smart device or from a controller, such as a bridge device, arranged for controlling the one or more lighting devices.

These and other aspects of the invention will be apparent from and elucidated with reference to the embodiments described hereinafter.

BRIEF DESCRIPTION OF THE DRAWINGS

In the drawings:

FIG. 1 shows schematically and exemplarily a method of controlling one or more lighting devices to generate a dynamic light effect based on an image, FIGS. 3a and 3b show schematically and exemplarily determination of a path in a first area in an image and selection of a sequence of sub-areas in the first area along the determined path.

DETAILED DESCRIPTION OF EMBODIMENTS

Figure 5:
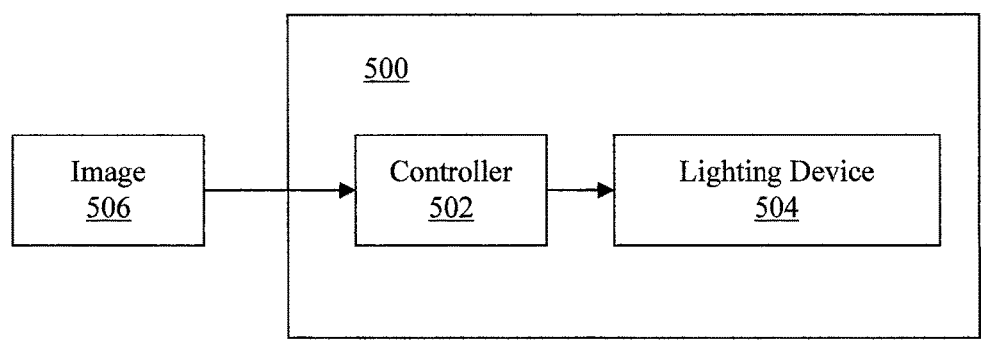
FIG. 5 shows schematically and exemplarily a lighting system.

FIG. 1 shows an embodiment of a method 100 of controlling one or more lighting devices 504, illustrated in FIG. 5, to generate a dynamic light effect. The method 100 comprising: receiving 110 an image 506; selecting a first area 120 in the received image based on first selection criteria; selecting a sequence of sub-areas 130 in the first area based on second selection criteria; extracting at least one color value 140 from each sub-area in the sequence of sub-areas; and controlling 150 the one or more lighting devices based on the extracted color values.

The number of sub-areas in the sequence of sub-areas, the size of the sub-areas and the number of colors extracted from each sub-area can depend on the desired length and variation of the light scene. These can, for example, be user selectable, predetermined or dependent on the received image or selection of the first area. An intelligent system can be capable of generating a dynamic light scene based on a few inputs. For example, two colors are provided and intermediate colors are determined. In another implementation of the method, the colors rendered are those comprised in the color set only and a system executing the method does not need to be arranged to create, for example, transitions between colors. If a system executing the method has more intelligence (e.g. processing power) to generate variations based on a limited number of sub-areas, as an example only, two or three sub-areas could suffice. A larger number, such as over ten sub-areas, would help to realize some more natural variation in the scene or can be used with a system having less intelligence.

Sub-areas can be overlapping or non-overlapping. Again, the amount of overlap can be user selectable, predetermined or dependent on the received image or selection of the first area. Selecting overlapping sub-areas can help to create smooth transitions. For example, if a user wants to have calm dynamics, subsequent sub-areas in the sequence of sub-areas can largely overlap (e.g. for a shifting window, only move a few percent along one sub-area axis such that sub-areas almost fully overlap) whereas if more vivid dynamics are desired, subsequent sub-areas can have a small overlap (e.g. 50% overlap or less).

The sequence of sub-areas can be selected based on a path. Such a path can be provided by a user, for example, by providing (touch) input via a user interface to indicate the path in the first area of the image. As an example, path input can be received from a user first; such that the first area is selected based on the sub-areas selected along the path. Further examples of determining a path are: using object detection such that a path can be determined that crosses and/or avoids certain objects or features in the image; or zooming into or out of an object in the image. As a simple example, a path can be determined by detecting a (substantially) linear element in the image, or by taking an axis of the image as a basis for determining a path. Linear elements in an image, such as a horizon, can be recognized using image analysis or an assumption can be made that a horizon is a horizontal line in an image between two areas of different (sets of) colors. The latter allows the path to simply run parallel along an image axis.

Figure 2B:
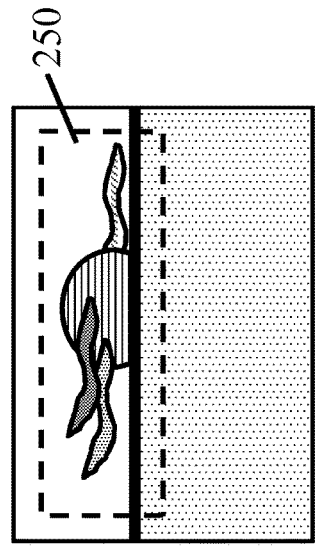
FIGS. 2a, 2b, 2c and 2d show schematically and exemplarily respectively an image, selection of a first area in the image, selection of a sequence of sub-areas in the first area of the image, and extraction of color values from the sequence of sub-areas.
Figure 2D:
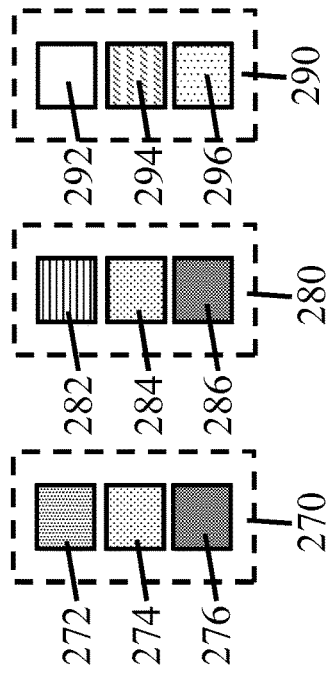
Figure 2A:
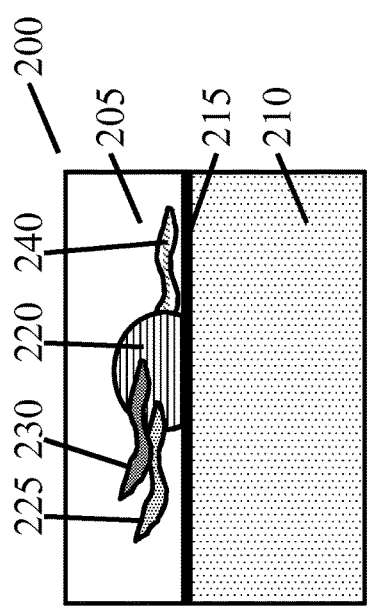
Figure 2C:
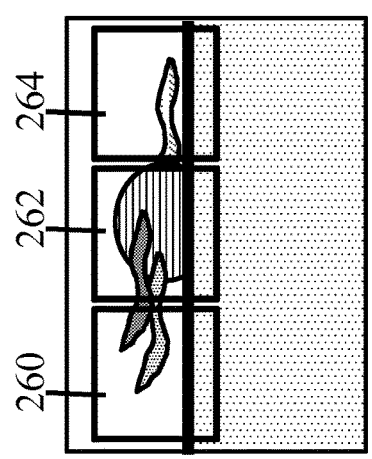

FIG. 2a shows a static image 200 of a sky 205 and body of water 210 with, along the horizon 215, a setting sun 220. The sky 205 comprises clouds 225, 230, 240. In FIG. 2b a selection of a first area 250 in the image is shown. FIG. 2c shows the selection of a sequence of sub-areas 260, 262, 264 in the first area. FIG. 2d shows three sets of colors 270, 280, 290 extracted from the sub-areas 260, 262, 264 respectively. The first set of colors 270 comprises the color 272 of cloud 225, the color 274 of the body of water 210, and the color 276 of cloud 230. The second set of colors 280 comprises the color 282 of the sun 220, the color 284 of the body of water 210, and the color 286 of cloud 230. The third set of colors 290 comprises the color 292 of the sky 205, the color 294 of cloud 240, and the color 296 of the body of water 210. As an example, a lighting system (not shown) comprising three lighting devices can be controlled to generate a dynamic lighting effect based on the three sets of colors 270, 280, 290. A first lighting device in the system can first emit light of color 272, then of color 282 and finally of color 292; similarly a second lighting devices emits a sequence of colors 274, 284, 294; and a third lighting device emits a sequence of colors 276, 286, 296. Other options for the dynamic light effect are for all three lighting devices to render the same colors synchronously (e.g. to create a more intense effect) or non-synchronously (e.g. to simulate clouds moving). The colors may be rendered in a particular order, for example colors from the same sub-area are rendered in a random sequence, yet a lighting device first renders the colors extracted from the first sub-area 260, and only then from the next sub-areas 262, 264 in sequence.

FIG. 3a shows an image 200 in which a first area 250 has been selected. A path 300 has been determined in the first area 250. The path can be determined based on an axis of the image (e.g. to horizontally cross the image), on object recognition (e.g. to encircle a recognized object), on a user providing the path as input, or on other criteria. In FIG. 3b, a sequence of sub-areas 310 has been plotted along the path 300. The set of colors can then be extracted from these sub-areas, and the dynamic light effect can be rendered.

Figure 4:
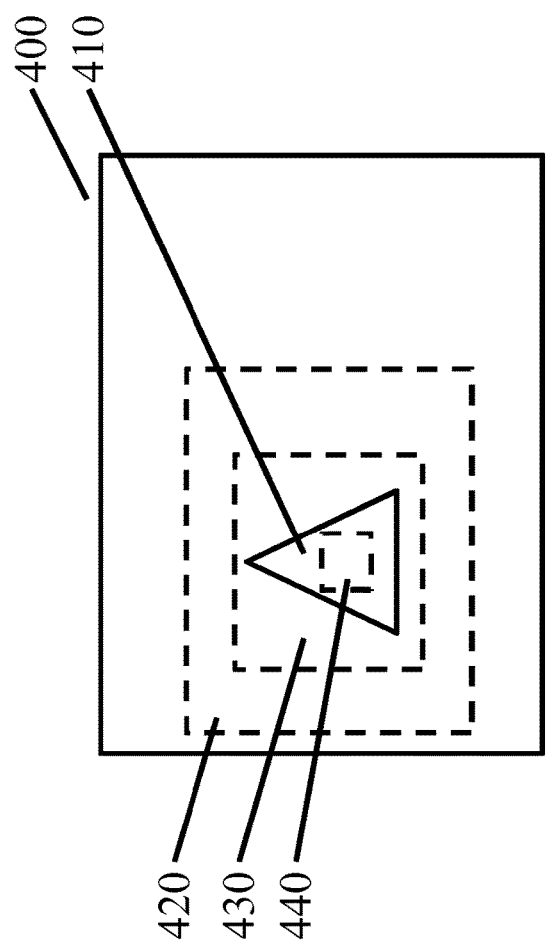
FIG. 4 shows schematically and exemplarily a selection of a sequence of sub-areas in a first area of an image to zoom in on an object in the image.

FIG. 4 shows an image 400 comprising an object 410 (e.g. a log fire, the object set against a beach background). Using image processing the object (i.e. the log fire, continuing the example) can be recognized as an area of interest and/or a salient feature in the image. For example, image processing can determine that the object 410 is a focal point in the image (e.g. the object 410 being in-focus and the remainder of the image, the beach background, being out-of-focus). As a further example, image processing can identify the object 410 and based on this determine that it should form the basis in the image 400 for generating a dynamic light effect. A first area 420 in the image 400 is selected, the first area 420 comprising the object 410. A sequence of sub-areas 430, 440 within the first area 420 is selected. In this example, sub-areas 430, 440 in the sequence are of increasingly smaller dimensions. Further, in this example, sub-area 440 is fully comprised in sub-area 430 and sub-area 430 is fully comprised in first area 420. This creates a zoom-effect, wherein the colors extracted to create the dynamic light effect are increasingly determined by the colors present in the object 410. The zoom effect can be based on the aforementioned image processing, such that a recognized object is zoomed in on for example. Another option is for a user to zoom into (an object in) the image, for example by performing a zoom gesture (e.g. pinch) on a touch screen.

The method can be executed by a computer program product, such as an application for a smart phone or an embedded software component on a controller 502 for a lighting system 500. Selection of the first area, the sequence of sub-areas and performing the extraction of the color values can, for example, comprise a fully automatic process, or it can be made dependent on user input or user confirmation. The extracted color values can, continuing the example, be presented to a user in a user interface, for example, alongside the image from which they are extracted.

The order in which colors are rendered by a lighting device or presented in a user interface can be determined such that there is minimal perceptual difference between subsequent colors. This produces a visually pleasant palette or gradient. If the perceptual difference between individual colors is defined as a cost, then an algorithm for sorting the palette is searching for a palette order such that total cost is minimum over the complete set of colors. For a linear gradient presented through a user interface or for rendering colors in sequence by a lighting device, the cost function can be defined as: Difference [1–2]+Difference [2–3]+ . . . +Difference [N–1–N]. Wherein each number (1, 2, . . . , N) is a color from the set of colors. When presenting a gradient in a user interface not in a linear fashion but radially, the cost function is: Difference [1–2]+Difference [2–3]+ . . . +Difference [N–1–N]+Difference [N–1]. For linear visualization, the difference between first and the last color in the palette is not relevant, while it has to be taken into account for radial palettes. As such, the most distant colors will most likely occur at the ends of the linear palette.

The perceptual difference between individual colors, as used in these cost functions, can be calculated with standard 'dE' functions (i.e. International Commission on Illumination's delta Empfindung metric) of various color spaces. The best results can be obtained with perceptually linear color spaces like CIELAB, CIELUV or CIECAM02. Optional further steps can be executed for linear ordering of the colors. For example, more dominant and more frequently occurring colors can be shown first (e.g. on the left in a horizontal gradient in a user interface).

The (ordered) colors can be turned into a gradient using standard gradient functions. For example, a function provided by the operating system of a smart phone on which the method is executed. If no gradient function is supported, as a further example, linear interpolation can be used.

When there are multiple lighting devices, colors can be assigned to individual lighting devices or each lighting device can render the same color(s). When lighting devices render different colors, the following is an example to illustrate how colors can be assigned to lighting devices. A first color for the first lighting device is picked (e.g. randomly or based on the ordered colors). The picked color can then be excluded from the color set and for the next lighting device a new color can be picked from the color set. This process can be repeated until all lighting devices (or light sources in a luminaire) have a color assigned. Alternatively, instead of randomly picking colors for the additional light sources, the adjacent colors of the color palette can be picked. This could have the advantage of creating a smooth color gradient in a space or on a luminaire with multiple light sources. Examples of other rules that can be applied to assign a color to a lighting device are: choosing a complementary color, choosing an opposite color, etc. Assigning colors to lighting devices can be applied to a group of lighting devices instead of a single lighting device or luminaire, e.g. multiple lighting devices in close proximity can be grouped together. As a further example, the calculated weight of dominant colors can be mapped to lighting devices according to the prominence of the light effect generated by each lighting device. For instance, for each lighting device an effect contribution factor may be determined based on the lighting device's position, type, number of lighting nodes, typical lumen output, etc. Colors that are more dominant in the palette, in the set of colors or in the (first area or sub-area) in the image can be assigned to lighting devices that have a large contribution factor.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of controlling a lighting device to generate a dynamic light effect, the method comprising:
    receiving an image,
    selecting a first area in the received image based on first selection criteria,
    selecting a sequence of sub-areas in the first area based on second selection criteria,
    extracting a set of color values, each color value of the set extracted from a different sub-area in the sequence of sub-areas; and
    controlling the lighting device based on the extracted set of color values to render a dynamic light effect,
wherein the selecting the first area in the received image based on the first selection criteria comprises:
    detecting, using image processing, a plurality of objects in the received image;
    selecting as the first area an area, comprising the detected objects;
    determining a non-linear path so that the path passes through object borders of said plurality of objects in the first area based on object-recognition of the plurality of objects; and
    selecting the sequence of sub-areas in the first area such that each sub-area of said sequence is disposed along the path.

2. The method according to claim 1, wherein the plurality of objects comprises at least one of a fire, a cloud, a body of water, a waterfall, and a heavenly body.

3. The method according to claim 1, wherein receiving the image comprises a user selecting the image from a set of images.

4. The method according to claim 1, wherein the determined path runs parallel to an axis of the received image.

5. The method according to claim 1, wherein the path in the first area of the received image is selected by a user.

6. The method according to claim 1, wherein the sub-areas in the sequence of sub-areas in the first area are of different sizes.

7. The method according to claim 6, wherein the sub-areas in the sequence of sub-areas are of an increasingly smaller size.

8. The method according to claim 1, wherein extracting a color value from a sub-area in the sequence of sub-areas comprises: extracting a dominant color value of the sub-area.

9. The method according to claim 1, the method further comprising:
    determining a particular order of the extracted color values based on at least one of: hue, saturation and brightness of the extracted color values, such that the one or more lighting devices are controlled based on the determined order of extracted color values.

10. A computer program product comprising a non-transitory storage medium including instructions configured to perform the method according to claim 1 when run on a computer device.

11. The method according to claim 1, wherein said plurality of objects is a majority of objects in said image.

12. The method according to claim 11, wherein said controlling the lighting device based on the extracted set of color values comprises controlling the lighting device to render color values in the extracted set in a same order in which the different sub-areas, from which said rendered color values were extracted, are disposed along said path.

13. The method according to claim 1, wherein said controlling the lighting device based on the extracted set of color values comprises controlling the lighting device to render color values in the extracted set in a same order in which the different sub-areas, from which said rendered color values were extracted, are disposed along said path.

* * * * *